3,344,127
DYEABLE POLYMERS OF ACRYLONITRILE WITH
p-ACRYLAMIDOBENZOIC ACIDS OR SALTS
THEREOF
James C. Masson, Chapel Hill, N.C., assignor to
Monsanto Company, a corporation of Delaware
No Drawing. Filed July 30, 1964, Ser. No. 386,438
9 Claims. (Cl. 260—80.73)

ABSTRACT OF THE DISCLOSURE

Acrylonitrile polymers have been modified by free radical initiated interpolymerization p-acrylamidobenzoic acid and alkali metal salts thereof in minor concentrations. The modified polymers are useful in the formation of acrylic fibers having enhanced basic dyeability.

---

This invention relates to novel acrylonitrile polymers having improved basic dye acceptance. The invention further relates to novel processes for improving the basic dye acceptance of acrylonitrile polymers.

Various means have been employed in the art to improve the basic dye acceptance of acrylic and modacrylic polymers. One such means involves polymerization through the use of an initiator such as the persulfate-bisulfite redox system. The use of the system inherently provides polymers having —OSO₃M and —SO₃M end groups as described in U.S. Patent 3,123,588. These groups enhance the ability of the polymer to take on a basic dye. A particular limitation of this type of increased dye acceptance is that adequate concentrations of the dye receptive groups are present only in polymers of relatively low molecular weight and where the polymer is to be used to produce fibers, films and filaments, for example, higher molecular weights are desirable to optimize the properties of the manufactured article. Accordingly, there is a need for other means by which the basic dyeability of acrylonitrile polymers can be increased, even where redox initiator systems are employed to prepare the polymers.

It is, therefore, an object of this invention to provide a means for increasing the basic dye acceptability of acrylonitrile polymers.

It is a further object of this invention to provide novel acrylonitrile polymers which may be used alone or blended with other polymers to provide fibers, films and filaments having improved basic dye acceptability.

These and other objects will become apparent from the ensuing description of the invention.

The objects of this invention are accomplished by the polymerization of acrylonitrile in the presence of certain p-acrylamidobenzoic acids or alkali metal salts thereof having the formula:

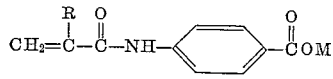

wherein R is H or methyl and M is H or an alkali metal. The basic dye receptive monomers of this invention are p-acrylamidobenzoic acid and p-methacryamidobenzoic acid. The compounds may be used in the form of their water soluble alkali metal salts.

In this process the acid monomers are randomly incorporated in the polymer chain as comonomers in small amounts to provide acrylonitrile polymers which are more readily dyed with basic dyes. Incorporation of the monomer may be varied over a wide range, the selection of particular concentrations being dependent upon the degree of increased dyeability desired. Normally concentrations of the acid monomer range from about 0.25 percent to about 10 percent based on the total monomer weight.

Preferably the acid monomer is incorporated in concentrations ranging from about 0.3 percent to about 4 percent.

The p-acrylamidobenzoic acids and salts of this invention may be polymerized with acrylonitrile and one or more monomers to provide terpolymers and tetrapolymers. The dye receptive terpolymers and tetrapolymers may be used alone or in combination with other acrylonitrile containing polymers to provide basic dye receptive polymer blends. While the preferred polymers of the instant invention are those containing at least 80 percent of acrylonitrile, generally recognized as the fiberforming acrylonitrile polymers, it will be understood that the invention is likewise applicable to polymers containing less than 80 percent acrylonitrile wherein similar improvements in basic dyeability are realized through incorporation of the dye receptive monomer defined herein. The acrylonitrile polymers containing less than 80 percent acrylonitrile are useful in forming films, coating compositions, molding operations, lacquers, etc., by means known to those skilled in the art.

For example, the polymer may be a terpolymer of from 80 to 98 percent acrylonitrile, from 0.5 to 2 percent of a p-acrylamidobenzoic acid or salt and up to 19.5 percent of another aliphatic monomer containing the

linkage and copolymerizable with acrylonitrile. Suitable mono-olefinic monomers include the acrylates, such as methyl methacrylate, ethyl methacrylate, butyl methacrylate, methoxymethyl methacrylate, β-chloroethyl methacrylate, and the corresponding esters of acrylic and α-chloroacrylic acids; vinyl chloride, vinyl bromide, vinylidene chloride, 1-chloro-1-bromoethylene; methacrylonitrile, acrylamide and methacrylamide; α-chloroacrylamide, or monoalkyl substitution products thereof; methyl vinyl ketone; vinyl carboxylates, such as vinyl acetate, vinyl chloracetate, vinyl proprionate, and vinyl stearate; N-vinylimides, such as N-vinylphthalimide and N-vinylsuccinimide; methylene malonic esters; N-vinyl carbazole, vinyl furance; alkyl vinyl esters; diethylcitraconate, diethylmesaconate, dimethylmesaconate, styrene, vinyl naphthalene; vinyl-substituted tertiary heterocyclic amines, such as the vinylpyridines and alkyl-substituted vinyl pyridines, for example, 2-vinylpyridine, 4-vinylpyridine, 2-methyl-5-vinylpyridine, etc.; 1-vinylimidazole and alkyl-substituted 1-vinylimidazoles, such as 2-, 4-, or 5-methyl-1-vinylimidazole, and other

containing polymerizable materials known to those skilled in the art.

The polymer may be a tetrapolymer, for example, products obtained by the interpolymerization of acrylonitrile and two or more of the above described monomers with the acid monomer of this invention. More specifically, and preferably, the tetrapolymer comprises acrylonitrile, vinyl-acetate, vinylidene chloride or vinyl chloride and the acid monomer. The tetrapolymers preferably contain from 80 to 97 percent of acrylonitrile, from 1 to 10 percent of a vinyl acetate and from 1 to 18 percent of another substance, such as methacrylonitrile, vinylidene chloride or vinyl chloride with a suitable amount of a p-acrylamidobenzoic acid or salt.

The polymer may also be a blend of polyacrylonitrile or of a binary interpolymer of from 80 to 99 percent acrylonitrile and from 1 to 20 percent of at least one other

containing substance with from 2 to 50 percent of the weight of the blend of a copolymer of from 10 to 70 percent of acrylonitrile and from 30 to 90 percent of at least one other

containing polymerizable monomer. Preferably, when the polymeric material comprises a blend, it will be a blend of a terpolymer of 90 to 98 percent acrylonitrile, from 2 to 9 percent of another mono-olefinic monomer, such as vinyl acetate, which is not receptive to dyestuff, and up to 4 percent of a p-acrylamidobenzoic acid with a sufficient amount of a copolymer of from 90–98 percent of acrylonitrile and from 10 to 2 percent of a vinyl monomer such as vinyl acetate, methyl methacrylate, vinyl chloride, vinylidene chloride or styrene.

The acrylonitrile polymer compositions defined herein which contain the dye receptive monomer of this invention in the polymer chain show a substantial improvement in basic dyeability. This invention makes possible relatively large improvements in basic dye acceptance of acrylonitrile polymer compositions, such improvements being attained with minute amounts of acidic monomer. The monomer employed is fairly inexpensive and its use use does not require change of existing methods for preparing acrylonitrile polymer compositions.

These polymers may be converted to articles of manufacture by well known conventional methods, for example, the wet-spinning and dry-spinning methods for the production of filaments and fibers. The fibers and filaments prepared in this manner will be found to have greatly improved affinity for basic dyes. If desirable, various additives such as light stabilizers, antistatic agents, and the like may be added to the compositions of the invention by any convenient means.

The polymers just described may be prepared by any conventional polymerization procedure, such as mass polymerization methods, solution polymerization methods, or aqueous emulsion methods. The polymerization is normally catalyzed by free radical catalysts and is carried out in equipment generally used in the art. However, the preferred practice utilizes suspension polymerization wherein the polymer is prepared in finely divided form for immediate use in the filament forming operations. The preferred suspension polymerization involves batch procedures, wherein monomers are charged with an aqueous medium containing the necessary catalyst. A more desirable method involves the semi-continuous procedure in which the polymerization reactor containing the aqueous medium is charged with the desired monomers gradually throughout the course of the reaction. Entirely continuous methods involving the gradual addition of monomers and the continuous withdrawal of polymer can also be employed.

The polymerization may be catalyzed by means of water-soluble salts of peroxy acids, sodium peroxide, hydrogen peroxide, sodium perborate, the sodium salts of other peroxy acids, and other water-soluble compounds containing the peroxy groups

A wide variation in the quantity of peroxy compound is possible. For example, from 0.1 to 3.0 percent by weight of the polymerizable monomers may be used. The so-called redox catalyst system is preferred in the process of this invention. Redox agents are generally compounds in a lower valent state which are readily oxidized to the higher valent state under the conditions of reaction. Through the use of this reduction oxidation system, it is possible to obtain polymerization to a substantial extent at lower temperatures than otherwise would be required. Suitable "redox" agents are sulfur dioxide, the alkali metal and ammonium bisulfites, and sodium formaldehyde sulfoxylate. The catalyst may be charged at the outset of the reaction, or it may be added continuously or in increments throughout the reaction for the purpose of maintaining a more uniform concentration of catalyst in the reaction mass. The latter method is preferred because it tends to make the resultant polymer more uniform in regard to its chemical and physical properties.

The following examples are given to illustrate the invention and should not be construed as limiting it. In the examples all parts and percents are given by weight unless otherwise indicated.

EXAMPLE I

The acid monomer, p-acrylamidobenzoic acid, was conveniently prepared by placing 13.7 grams (0.1 mol) of p-aminobenzoic acid and 13.8 grams (0.1 mol) of potassium carbonate in a Waring Blendor. The Blendor was turned on at half speed and a solution of 9.0 grams (0.1 mol) of acrylyl chloride in 150 ml. of chloroform was slowly added, whereupon pronounced foaming was observed. After blending for 0.5 hour a small amount of undissolved material was filtered from the solutions. The filtrate was then acidified by addition of conc. hydrochloric acid causing a voluminous precipitate which was filtered and triturated with ether. The precipitate was then recrystallized from an ether-water-acetone mixture and determined to be p-acrylamindobenzoic acid having a melting point of 253°–5° C.

EXAMPLE II

In this example a semi-batch polymerization process was employed wherein the addition of the acid monomer prepared in Example I and initiator was carried out during a two hour period. The polymerization vessel was maintained at 50° C. and was purged with nitrogen before and throughout the course of the reaction. To the polymerization vessel 500 parts of water, 90 parts of acrylonitrile, 9 parts of vinyl acetate and 1 part of p-acrylamidobenzoic acid, 1 part potassium persulfate and 1 part of sulfur dioxide (added as sodium bisulfite) were mixed together. At the end of the polymerization reaction a white polymer was obtained having a specific viscosity ($\eta$ sp) of 0.16 (determined as 0.1 percent solution of dimethylformamide).

EXAMPLE III

Using the procedure and reactants of Example II modified to the extent that 88.2 parts of acrylonitrile, 8.8 parts of vinyl acetate and 3.0 parts of p-acrylamidobenzoic acid were used in the polymerization recipe with 1.2 parts of $K_2S_2O_8$ and 1.2 parts of $SO_2$. A white polymer containing p-acrylamidobenzoic acid as a comonomer having a specific viscosity of 0.18 was isolated.

EXAMPLE IV

Using the same procedure of Example II modified to the extent that 91 parts of acrylonitrile and 9.0 parts of vinyl acetate were used, a white polymer having a viscosity of 0.15 was obtained as a control.

EXAMPLE V

Using the procedure and weight proportions of the reactants in Example II p-methacrylamidobenzoic acid was substituted for p-acrylamidobenzoic acid as the dye receptive monomer to prepare a polymer having a specific viscosity of 0.18.

EXAMPLE VI

The basic dye acceptance (BDA) of the acrylonitrile polymers prepared in Examples II–IV was measured using "Sevron Blue 2G" dye (C.I. Basic Blue 22). The procedure consists of mixing a buffered solution (pH 5.4) solution of the dye with the polymer sample in a sealed tube at 100° C. for two hours. The polymer was then removed from the tube, filtered, washed and the filtrate analyzed spectrophotometrically to determine the amount of dye remaining and from this the percentage of dye uptake was quantitatively determined. This percentage is identified as basic dye acceptance (BDA).

| Polymer of Example: | Percent BDA |
|---|---|
| II | 14.4 |
| III | 18.4 |
| IV | 12.7 |
| V | 16.6 |

The above examples illustrate improved basic dye acceptance of the polymer. Notwithstanding this improvement in basic dye acceptance, other properties of the modified acrylic polymers are not found to be adversely effected.

It will be understood by those skilled in the art that many widely different embodiments of this invention can be made without departing from the spirit and scope thereof. Accordingly, it is to be understood that this invention is not to be limited to the specific embodiments thereof except as defined in the appended claims.

I claim:
1. A basic dyeable fiber-forming acrylonitrile polymer comprising at least about 80 percent by weight of acrylonitrile and from about 0.25 to about 10 percent by weight of a comonomer having the formula

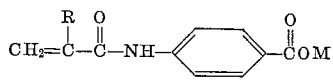

wherein R is a member of the group consisting of H and methyl and M is a member of the group consisting of H and alkali metal.

2. A basic dyeable fiber-forming acrylonitrile polymer comprising at least about 80 percent by weight of acrylonitrile and up to about 19.5 percent by weight of at least one copolymerizable monomer having the aliphatic group,

and from about 0.5 to about 2 percent by weight of a monomer having the formula

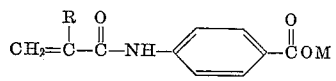

wherein R is a member of the group consisting of H and methyl and M is a member of the group consisting of H and alkali metal.

3. The polymer of claim 2 wherein R is H.
4. The polymer of claim 2 wherein R is methyl.
5. In a process for the polymerization of acrylonitrile to form a basic dyeable fiber-forming polymer having at least about 80 percent by weight of acrylonitrile which comprises contacting acrylonitrile in the presence of a free radical catalyst and from about 0.25 to about 10 percent by weight based on total monomer of a comonomer having the formula

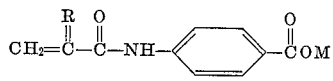

wherein R is a member of the group consisting of H and methyl and M is a member of the group consisting of H and alkali metal.

6. The process of claim 5 wherein R is H.
7. The process of claim 5 wherein R is methyl.
8. The process of claim 5 wherein said comonomer is p-acrylamidobenzoic acid.
9. The process of claim 8 wherein the reaction is conducted in the presence of a small amount of vinyl acetate as a third monomer.

References Cited
UNITED STATES PATENTS
2,976,294  3/1961  Firestine _____ 260—80.5

FOREIGN PATENTS
898,065  6/1962  Great Britain.

JOSEPH L. SCHOFER, *Primary Examiner.*

JAMES A. SEIDLECK, *Examiner.*

H. WONG, *Assistant Examiner.*